(12) United States Patent
Ushiki et al.

(10) Patent No.: US 11,642,959 B2
(45) Date of Patent: May 9, 2023

(54) TRANSFER FOR FOUR WHEEL DRIVE VEHICLE

(71) Applicant: SUBARU CORPORATION, Tokyo (JP)

(72) Inventors: Masayuki Ushiki, Tokyo (JP); Katsuya Higuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/841,970

(22) Filed: Jun. 16, 2022

(65) Prior Publication Data

US 2023/0019664 A1 Jan. 19, 2023

(30) Foreign Application Priority Data

Jul. 13, 2021 (JP) .............................. JP2021-115577

(51) Int. Cl.
*B60K 23/08* (2006.01)
*B60K 17/346* (2006.01)

(52) U.S. Cl.
CPC ...... *B60K 17/3467* (2013.01); *B60K 23/0808* (2013.01); *B60K 2023/0858* (2013.01)

(58) Field of Classification Search
CPC ............ B60K 17/3467; B60K 23/0808; B60K 2023/0858
See application file for complete search history.

(56) References Cited

U.S. PATENT DOCUMENTS

| | | | |
|---|---|---|---|
| 4,981,191 A | 1/1991 | Shibahata | |
| 7,186,199 B1 * | 3/2007 | Baxter, Jr. | ......... B60K 23/0808 475/206 |
| 2006/0207854 A1 * | 9/2006 | Baasch | ............. B60K 23/0808 192/48.8 |

FOREIGN PATENT DOCUMENTS

| | | | | |
|---|---|---|---|---|
| DE | 102008039927 A1 * | 3/2010 | ............. | B60K 17/06 |
| GB | 2431442 A * | 4/2007 | ......... | B60K 23/0808 |
| JP | H01-182128 A | 7/1989 | | |

* cited by examiner

*Primary Examiner* — Justin Holmes
(74) *Attorney, Agent, or Firm* — McGinn I.P. Law Group, PLLC.

(57) ABSTRACT

A transfer for a four wheel drive vehicle includes first and second distribution mechanisms that respectively include first and second clutches configured to be controlled to a half-engaged state. The first and second distribution mechanisms distribute a portion of power outputted from a power source to a second transmission mechanism respectively through the first and second clutches. A first difference is different from a second difference. The first difference is a difference between a gear ratio from an input shaft of the first clutch to a first driving wheel and a gear ratio from an output shaft of the first clutch to a second driving wheel. The second difference is a difference between a gear ratio from an input shaft of the second clutch to the first driving wheel and a gear ratio from an output shaft of the second clutch to the second driving wheel.

12 Claims, 9 Drawing Sheets

TRANSFER FOR FOUR WHEEL DRIVE VEHICLE

CROSS-REFERENCE TO RELATED APPLICATIONS

This application claims priority from Japanese Patent Application No. 2021-115577 filed on Jul. 13, 2021, the entire contents of which are hereby incorporated by reference.

BACKGROUND

The technology relates to a transfer for a four wheel drive vehicle. Japanese Unexamined Patent Application Publication (JP-A) No. H01-182128 discloses a four wheel drive vehicle including a propeller shaft that transmits power between a front wheel drive axle and a rear wheel drive axle.

SUMMARY

An aspect of the technology provides a transfer for a vehicle. The vehicle is a wheel drive vehicle and includes a first driving wheel, a second driving wheel, a power source, a first transmission mechanism, and a second transmission mechanism. The first driving wheel and the second driving wheel are arranged in longitudinally spaced relation. The first transmission mechanism is configured to transmit power to the first driving wheel. The second transmission mechanism is configured to transmit power to the second driving wheel. The transfer includes a first distribution mechanism and a second distribution mechanism. The first distribution mechanism includes a first clutch and is configured to distribute a portion of power from the power source to the second transmission mechanism through the first clutch. The first clutch is configured to be controlled to a half-engaged state between engagement and disengagement. The second distribution mechanism includes a second clutch and is configured to distribute a portion of power from the power source to the second transmission mechanism through the second clutch. The second clutch is configured to be controlled to the half-engaged state. A first difference is different from a second difference. The first difference is a difference between a gear ratio from an input shaft of the first clutch to the first driving wheel and a gear ratio from an output shaft of the first clutch to the second driving wheel. The second difference is a difference between a gear ratio from an input shaft of the second clutch to the first driving wheel and a gear ratio from an output shaft of the second clutch to the second driving wheel.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1A:
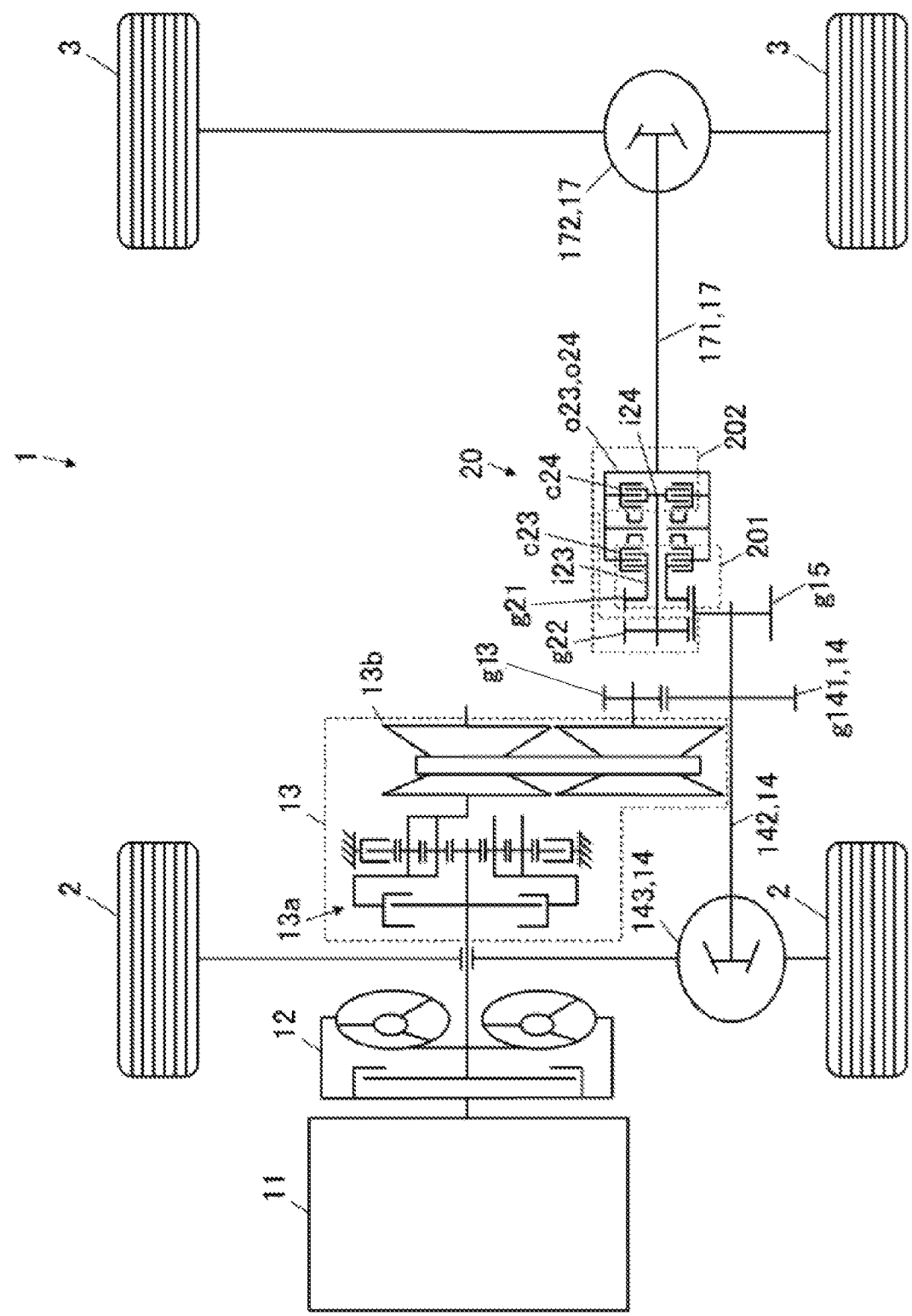
FIG. 1A is a schematic diagram of a drive mechanism of a vehicle including a transfer according to a first embodiment of the technology.

In the four wheel drive vehicle disclosed in JP-A No. H01-182128, a lock-up clutch, a speed increasing clutch, and a speed increasing mechanism are provided along the propeller shaft. One of the speed increasing clutch or the lock-up clutch is controlled to engagement while the other is controlled to disengagement. Switching which clutch to engage allows for two-stage switching of a power distribution ratio between front wheels and rear wheels.

It is desirable to provide a transfer for a four wheel drive vehicle that makes it possible to control a power distribution ratio in a wide range both on straight travel and when cornering.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

In this specification, in the notation "a gear ratio from A to B", the gear ratio means "a rotation speed of A divided by a rotation speed of B (rotation speed of A/rotation speed of B)". That is, in a case where rotary motion is transmitted from A to B, the gear ratio as mentioned above corresponds to a speed reducing ratio. In the notation "a gear ratio to front wheels 2", the gear ratio means a gear ratio on straight travel with the left and right front wheels 2 rotating at the same speed. Likewise, in the notation "a gear ratio to rear wheels 3", the gear ratio means a gear ratio on straight travel with the left and right rear wheels 3 rotating at the same speed.

In the description of the embodiments, the notation "a gear is fitted to a shaft" means that the gear and the shaft rotate unitarily.

<First Embodiment>

FIG. 1A is a schematic diagram of a drive mechanism of a vehicle including a transfer according to a first embodiment of the technology. A vehicle 1 in FIG. 1A includes a four wheel drive vehicle. The vehicle 1 may include, without limitation, the two front wheels 2 and the two rear wheels 3. The two front wheels 2 include the left and right front wheels 2. The two rear wheels 3 include the left and right rear wheels 3. In one embodiment of the technology, the front wheels 2 may each serve as a "a first driving wheel" and the rear wheels 3 may each serve as a "second driving wheel". In the vehicle 1 including four wheels, the four wheel drive vehicle is also referred to as an all wheel drive vehicle. In a case with a vehicle including six or more wheels, the four wheel drive vehicle may mean a vehicle in which solely four wheels in longitudinally and laterally spaced arrangement serve as driving wheels, or alternatively, the four wheel drive vehicle may mean a vehicle in which six or more wheels serve as driving wheels.

As illustrated in FIG. 1A, the vehicle 1 may include, without limitation, a power source 11, a torque converter 12, and a transmission 13. The torque converter 12 may receive an output of the power source 11 to amplify torque. The transmission 13 may perform shifting of an output of the torque converter 12. The power source 11 may include, without limitation, an engine, or an internal combustion engine. Alternatively, the power source 11 may include, without limitation, an electric motor. The transmission 13 may include, without limitation, a forward and reverse switching mechanism 13a and a CVT (Continuously Variable Transmission) 13b. The transmission 13 may transmit power to a front wheel transmission shaft 142 through a gear g13.

The vehicle 1 may further include, without limitation, a first transmission mechanism 14, a second transmission mechanism 17, and a transfer 20. The first transmission mechanism 14 may transmit power to the front wheels 2. The second transmission mechanism 17 may transmit power to the rear wheels 3. The transfer 20 may distribute power between the first transmission mechanism 14 and the second transmission mechanism 17.

The first transmission mechanism 14 may include, without limitation, an input gear g141, a front wheel transmission shaft 142, and a differential gear 143. The input gear g141 may receive power from the transmission 13. The front wheel transmission shaft 142 may extend in a longitudinal direction of the vehicle 1. The differential gear 143 may distribute rotation of the front wheel transmission shaft 142 to the left front wheel 2 and the right front wheel 2. The input gear g141 may be fitted to the front wheel transmission shaft 142.

The second transmission mechanism 17 may include, without limitation, a rear wheel transmission shaft 171 and a differential gear 172. The rear wheel transmission shaft 171 may extend in the longitudinal direction of the vehicle 1. The differential gear 172 may distribute rotation of the rear wheel transmission shaft 171 to the left rear wheel 3 and the right rear wheel 3.

The transfer 20 may include, without limitation, a first distribution mechanism 201 and a second distribution mechanism 202. The transfer 20 is configured to distribute power from the front wheel transmission shaft 142 to the rear wheel transmission shaft 171 by two paths through the two distribution mechanisms 201 and 202. The first distribution mechanism 201 may include, without limitation, a first driven gear g21 and a first clutch c23. The first driven gear g21 may be fitted to an input shaft of the first distribution mechanism 201. The first clutch c23 may be interposed between the input shaft and the rear wheel transmission shaft 171. The second distribution mechanism 202 may include, without limitation, a second driven gear g22 and a second clutch c24. The second driven gear g22 may be fitted to an input shaft of the second transfer mechanism 202. The second clutch c24 may be interposed between the input shaft and the rear wheel transmission shaft 171. A driving gear g15 may be fitted to the front wheel transmission shaft 142. The driving gear g15 may be engaged with the first driven gear g21 and the second driven gear g22. The transfer 20 may introduce power from the front wheel transmission shaft 142 through the first driving gear g15.

In one embodiment of the technology, out of the constituent elements mentioned above, a combination of the driving gear g15 and the first driven gear g21 may serve as a "first gear set". In one embodiment of the technology, a combination of the driving gear g15 and the second driven gear g22 may serve as a "second gear set".

The first clutch c23 may include, without limitation, an input shaft i23, an output shaft o23, a driven clutch plate, a drive clutch plate, a clutch housing, and a clutch hub. The second clutch c24 may include, without limitation, an input shaft i24, an output shaft o24, a driven clutch plate, a drive clutch plate, a clutch housing, and a clutch hub. The first clutch c23 may include, for example, a hydraulically controlled multi-disk clutch. The first clutch c23 may be brought to a half-engaged state as an intermediate state between engagement and disengagement by a hydraulic control. The engagement means a state of about 100% torque transmission from the input shaft i23 to the output shaft o23. The disengagement means about 0% torque transmission from the input shaft i23 to the output shaft o23. The first clutch c23 is configured to change continuously a torque transmission rate in a predetermined range of, for example, 0% to 100% by changing pressure of hydraulic oil to be supplied. The second clutch c24 may be configured similarly to the first clutch c23. It is to be noted that the first clutch c23 and the second clutch c24 may have a configuration in which the torque transmission rate is continuously controlled by power of an electric actuator.

The first clutch c23 and the second clutch c24 may be disposed in adjacency to each other in an axial direction, i.e., a direction along a rotation axis. Furthermore, the driven clutch plate and the drive clutch plate of the first clutch c23, and the driven clutch plate and the driven clutch plate of the second clutch c24 may have the same respective sizes. Moreover, the clutch housing of the first clutch c23 and the clutch housing of the second clutch c24 may be unitized. The clutch housing may be fitted to the driven clutch plate of the first clutch c23 and rotate unitarily therewith, and be fitted to the driven clutch plate of the second clutch c24 and rotate unitarily therewith. The clutch housing may be linked to the output shafts o23 and o24, and to the rear wheel transmission shaft 171, to transmit power to the rear wheel transmission shaft 171.

The number of teeth of the first driven gear g21 may be different from the number of teeth of the second driven gear g22. In one example, the number of teeth of the first driven gear g21 may match the number of teeth of the driving gear g15, and the number of teeth of the second driven gear g22 may be greater than the number of teeth of the driving gear g15.

On a power transmission path between the input shaft i23 of the first clutch c23 and the front wheels 2, the gear set of the first driven gear g21 and the driving gear g15, and the differential gear 143 may be interposed. Accordingly, a gear ratio of the gear set and a gear ratio of the differential gear 143 determine an overall gear ratio from the input shaft i23 to the front wheels 2. The overall gear ratio from the input shaft i23 to the front wheels 2 equals to a rotation speed of the input shaft i23 divided by a rotation speed of the front wheels 2. The gear ratio is referred to as a "gear ratio frontward of the first clutch c23".

On a power transmission path between the output shaft o23 of the first clutch c23 and the rear wheels 3, the differential gear 172 may be interposed. Accordingly, a gear ratio of the differential gear 172 determines an overall gear ratio from the output shaft o23 to the rear wheels 3. The overall gear ratio from the output shaft o23 to the rear wheels 3 equals to a rotation speed of the output shaft o23 divided by a rotation speed of the rear wheels 3. The gear ratio is referred to as a "gear ratio rearward of the first clutch c23".

On a power transmission path between the input shaft i24 of the second clutch c24 and the front wheels 2, the gear set of the second driven gear g22 and the driving gear g15, and the differential gear 143 may be interposed. Accordingly, a gear ratio of the gear set and the gear ratio of the differential gear 143 determine an overall gear ratio from the input shaft i24 to the front wheels 2. The overall gear ratio from the input shaft i24 to the front wheels 2 equals to a rotation speed of the input shaft i24 divided by the rotation speed of the front wheels 2. The gear ratio is referred to as a "gear ratio frontward of the second clutch c24".

On a power transmission path between the output shaft o24 of the second clutch c24 and the rear wheels 3, the differential gear 172 may be interposed. Accordingly, the gear ratio of the differential gear 172 determines an overall gear ratio from the output shaft o24 to the rear wheels 3. The overall gear ratio from the output shaft o24 to the rear wheels 3 equals to a rotation speed of the output shaft o24 divided by the rotation speed of the rear wheels 3. The gear ratio is referred to as a "gear ratio rearward of the second clutch c24".

On the power transmission path from the first clutch c23 or the second clutch c24 to the front wheels 2, or on the power transmission path from the first clutch c23 or the second clutch c24 to the rear wheels 3, a configuration having another gear ratio may be interposed. In this case, the overall gear ratio as mentioned above may be determined from gear ratios of a plurality of configurations including the gear ratio.

A first difference is different from a second difference. The first difference is a difference between the gear ratio frontward of the first clutch c23 and the gear ratio rearward of the first clutch c23. The second difference is a difference between the gear ratio frontward of the second clutch c24 and the gear ratio rearward of the second clutch c24.

In one example, the gear ratio frontward of the second clutch c24 may be greater than the gear ratio rearward of the second clutch c24. As to the difference between the gear ratios, the rear ratio rearward may be greater than the gear ratio frontward, by about 0.5% to 3%. By the difference between the gear ratios, the input shaft i24 of the second clutch c24 rotates at a higher speed than the output shaft o24 of the second clutch c24 on straight travel with the front wheels 2 and the rear wheels 3 rotating at the same speed. Accordingly, bringing the second clutch c24 to the half-engaged state causes transmission of a motive force from the input shaft i24 to the output shaft o24, and transmission of a braking force, i.e., internal circulation torque, from the output shaft o24 to the input shaft i24.

The gear ratio frontward of the first clutch c23 may be equal to the gear ratio rearward of the first clutch c23. The term "equal" is not limited to exact coincidence, but includes coincidence including a negligible error as compared with the difference between the gear ratios frontward and rearward of the second clutch c24, e.g., 0.5% to 3%.

Figure 1B:
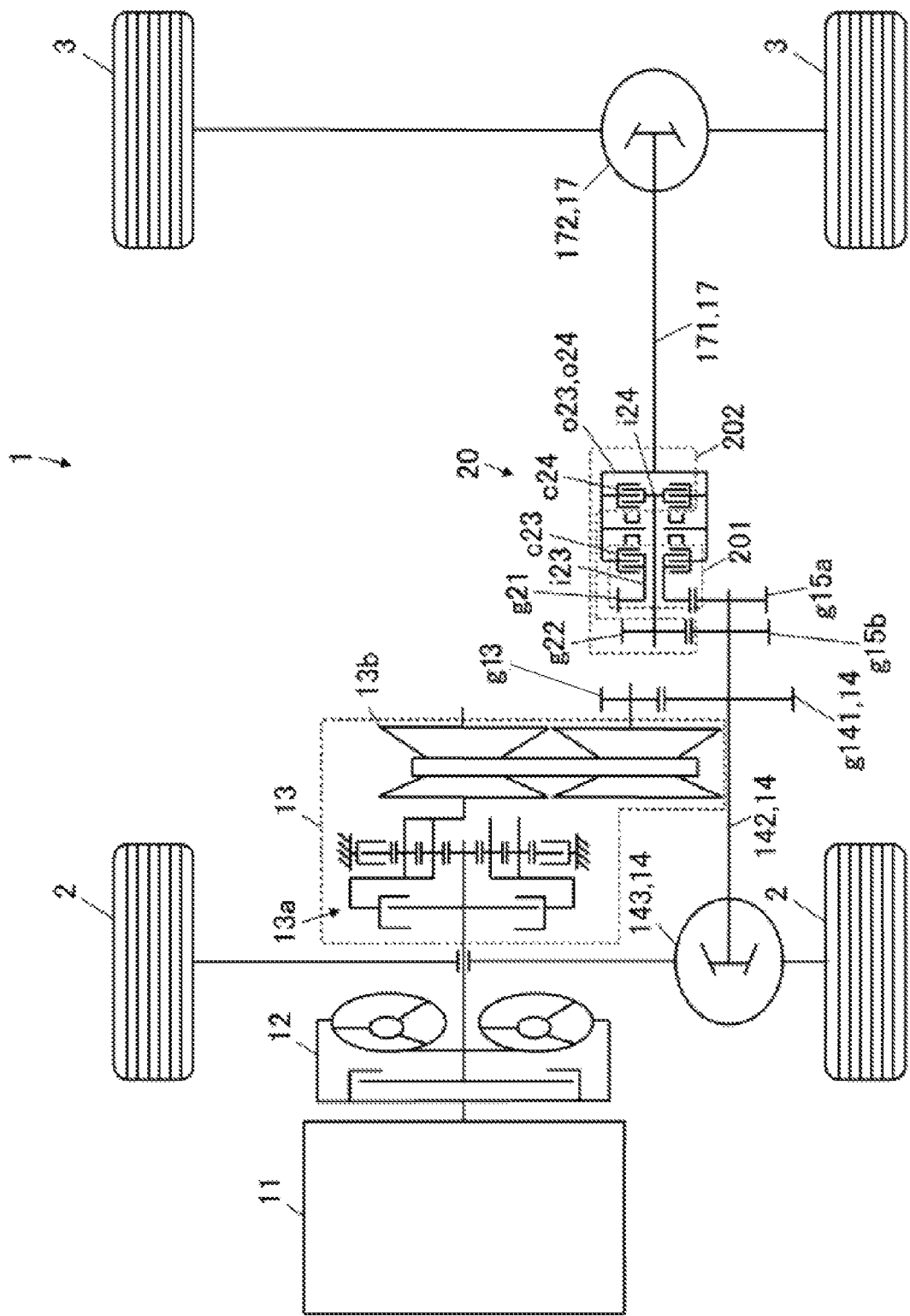
FIG. 1B is a schematic diagram of a drive mechanism of a vehicle including a transfer according to a modification example of the first embodiment.

FIG. 1B is a schematic diagram of a modification example of the transfer according to the first embodiment. As illustrated in FIG. 1B, the transfer 20 may include two driving gears g15a and g15b that differ in the number of teeth, as driving gears that transmit power from the front wheel transmission shaft 142. In the modification example, the driving gear g15a may be engaged with the first driven gear g21, and the other driving gear g15b may be engaged with the second driven gear g22. Such a configuration involves an increase in the number of gears. However, selecting the number of teeth for each of the gears g15a, g15b, g21, and g22 makes it possible to easily provide target gear ratios on the transmission path through the first driven gear g21 and the transmission path through the second driven gear g22.

In one embodiment of the technology, out of the constituent elements mentioned above, a combination of the driving gear g15a and the first driven gear g21 may serve as the "first gear set". In one embodiment of the technology, a combination of the driving gear g15b and the second driven gear g22 may serve as the "second gear set".

Figure 2:
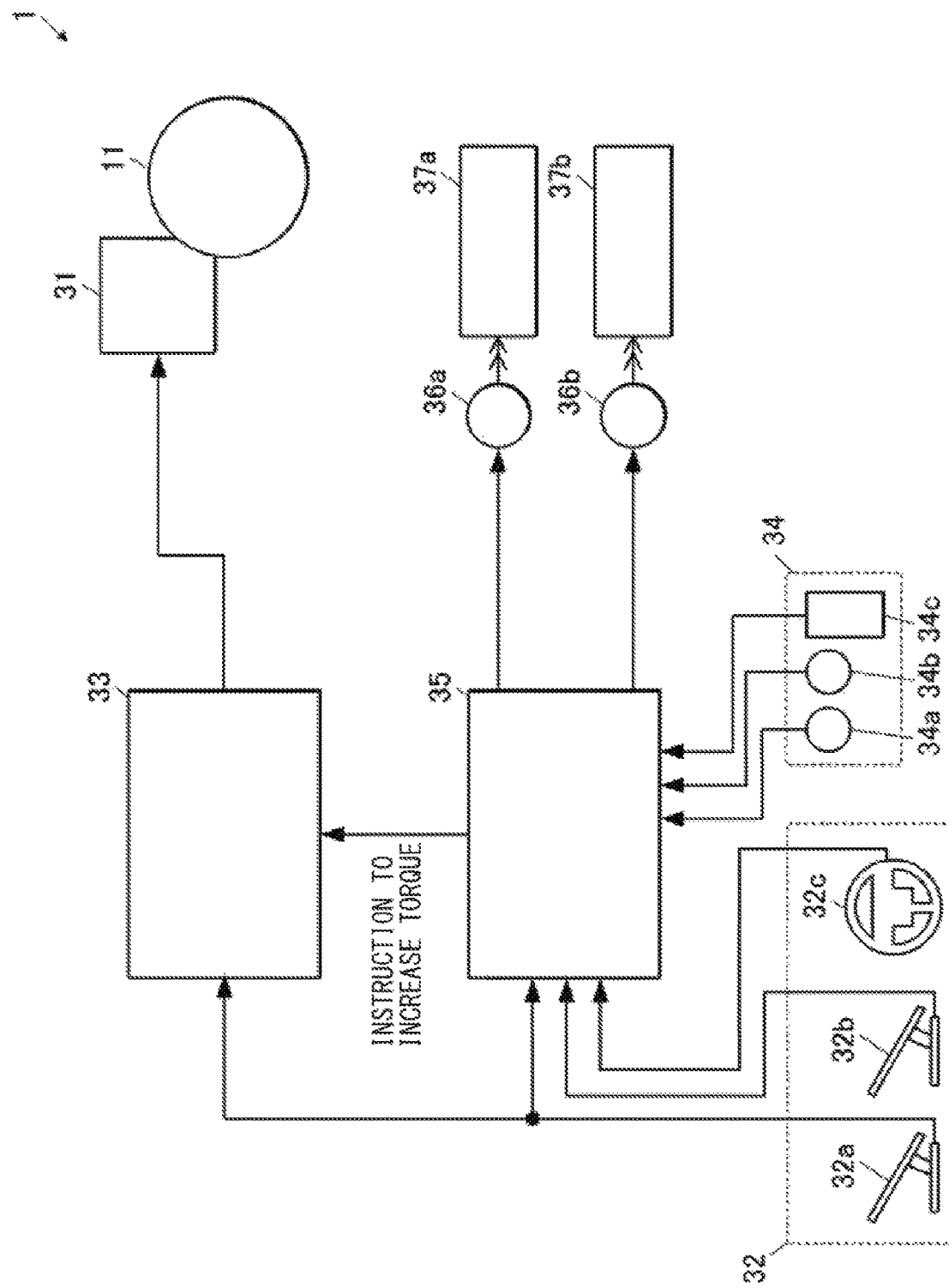
FIG. 2 is a block diagram of a configuration of a control system of the vehicle according to the first embodiment.

FIG. 2 is a block diagram of a configuration of a control system of the vehicle according to the first embodiment. The vehicle 1 may further include, without limitation, auxiliaries 31, a driving operation unit 32, a travel control processor 33, and sensors 34. The auxiliaries 31 is provided for driving the power source 11. The driving operation unit 32 may be operated by a driver who drives the vehicle 1. The travel control processor 33 may control the auxiliaries 31 in accordance with an operation on the driving operation unit 32. The sensors 34 may detect a traveling situation. Moreover, the transfer 20 in the first embodiment may include, for example, hydraulic cylinders 37a and 37b, and a processor 35. The hydraulic cylinders 37a and 37b may change a degree of engagement of each of the first clutch c23 and the second clutch c24. The processor 35 may control the hydraulic cylinders 37a and 37b through control valves 36a and 36b. The hydraulic cylinders 37a and 37b may be replaced with electric actuators.

The driving operation unit 32 may include, without limitation, an accelerator operation part 32a, a brake operation part 32b, and a steering part 32c. The accelerator operation part 32a is provided for accelerating the vehicle 1. The brake operation part 32b is provided for decelerating the vehicle 1. The steering part 32c is provided for controlling a direction of travel of the vehicle 1. A signal indicating an amount of operation of the accelerator operation part 32a may be transmitted to the travel control processor 33 and the processor 35. A signal indicating amounts of operations of the brake operation part 32b and the steering part 32c may be transmitted to the processor 35.

The sensors 34 is provided for detecting the traveling situation. The sensors 34 may include, without limitation, a vehicle speed sensor 34a, a yaw rate sensor 34b, and a travel path sensor 34c. The yaw rate sensor 34b may measure a change in a yaw angle of the vehicle 1. The travel path sensor 34c may detect entry of the vehicle 1 into a curve. The travel path sensor 34c may be configured to cooperate with, for example, a navigation system and predict the entry of the vehicle into a curve on the basis of a preset planned travel path and a present position of the vehicle 1. Each detection result of the sensors 34 may be transmitted to the processor 35.

The travel control processor 33 may include, without limitation, an ECU (Electronic Control Unit). The travel control processor 33 may include one ECU, or alternatively, the travel control processor 33 may include a plurality of ECUs that communicate with one another and operate in cooperation with one another.

The travel control processor 33 may calculate requested torque corresponding to the operation of the accelerator operation part 32a and calculate target torque by placing a predetermined restriction on the requested torque. The requested torque means torque requested to be outputted on the basis of the driving operation. The target torque means torque to be controlled to be actually outputted from the power source 11. Non-limiting examples of the restriction to be placed on the requested torque may include to limit a rate of change in the torque to an upper limit or lower to avoid a sudden change in the torque. After calculating the target torque, the travel control processor 33 may operate the auxiliaries 31 to allow the target torque to be outputted from the power source 11. In a case where the vehicle 1 comprises an automatic driving control device configured to automatically control an acceleration of the vehicle 1, the travel control processor 33 may calculate the requested torque and the target torque based on signals output from the automatic driving control device, instead of based on the operation of the accelerator operation part 32a by the driver.

The travel control processor 33 and the processor 35 are configured to transmit an instruction to increase the torque, from the processor 35 to the travel control processor 33. Upon receiving the instruction to increase the torque, the travel control processor 33 may add an amount of increase in the torque to the target torque calculated on the basis of the requested torque, to update the target torque.

The processor 35 may include, without limitation, an ECU. The processor 35 may include one ECU, or alternatively, the processor 35 may include a plurality of ECUs that communicate with one another and operate in cooperation with one another. A portion or all of the processor 35 may share an ECU or ECUs with the travel control processor 33.

The processor 35 may make a control of the degrees of engagement of the first clutch c23 and the second clutch c24 of the transfer 20 on the basis of the signals from the driving operation unit 32 and signals from the sensors 34. The control of the degrees of engagement makes it possible to provide a control of a power distribution ratio between the front wheels 2 and the rear wheels 3 in accordance with the traveling situation of the vehicle 1.

<Workings of Transfer 20>

Figure 3A:
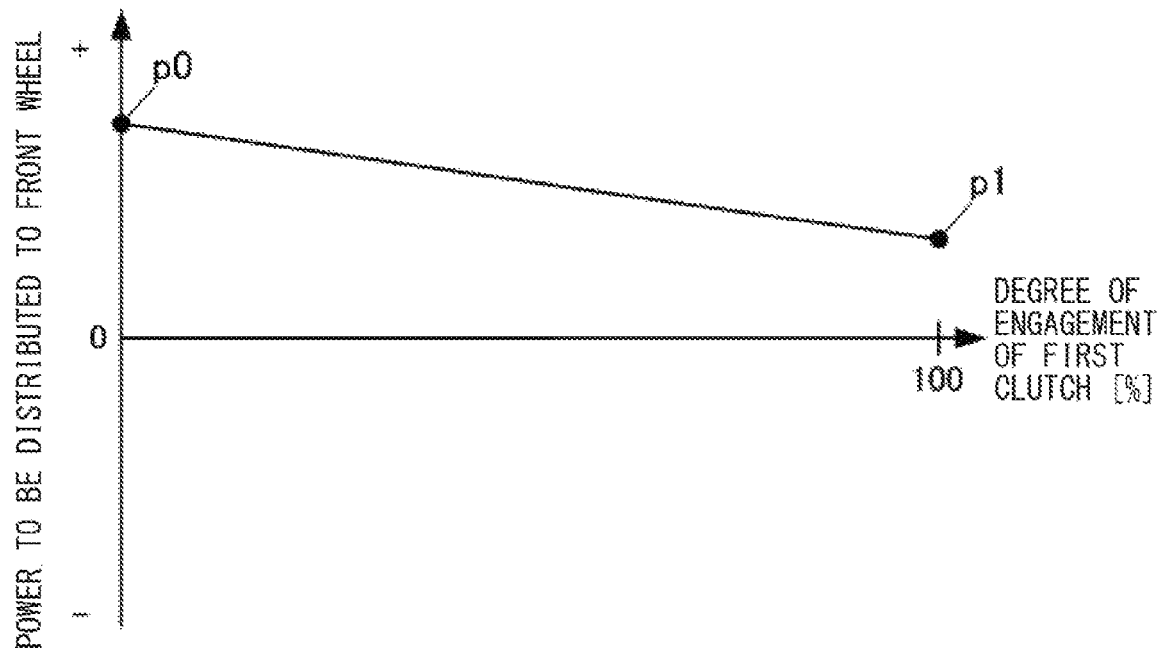
FIG. 3A is a graph that illustrates relation between a degree of engagement of a first clutch and power to be distributed to front wheels.

FIG. 3A is a graph illustrating relation between the degree of engagement of the first clutch c23 and power to be distributed to the front wheels 2. The graph illustrates the relation as mentioned above, in a case where a steering angle of the vehicle 1 is zero, i.e., the vehicle 1 is on straight travel, the second clutch c24 is disengaged, and constant power is being outputted from the power source 11.

In a state in which both the first clutch c23 and the second clutch c24 are disengaged, power of the front wheel transmission shaft 142 is not distributed to the rear wheel transmission shaft 171. Accordingly, power to be outputted to the front wheels 2 becomes greater. This corresponds to a state at a point p0 of the graph in FIG. 3A.

In a state in which the first clutch c23 is engaged and the second clutch c24 is disengaged, power of the front wheel transmission shaft 142 is transmitted to the rear wheel transmission shaft 171 through the first clutch c23. By setting the gear ratios frontward and rearward of the first clutch c23 as mentioned above, almost half of power is transmitted to the rear wheel transmission shaft 171 because a rotation speed ratio between the input shaft i23 and the output shaft o23 of the first clutch c23 is 1:1. Thus, power to be outputted to the front wheels 2 is reduced by about half. This corresponds to a state at a point p1 of the graph in FIG. 3A.

In a state in which the second clutch c24 is disengaged and the degree of engagement of the first clutch c23 changes from 0% to 100%, as illustrated in FIG. 3A, power to be outputted to the front wheels 2 continuously decreases from a value at the point p0 to a value at the point p1.

To the rear wheels 3, power to be obtained by subtracting the power to be distributed to the front wheels 2 and a loss from the output of the power source 11 is outputted. Accordingly, in a case where the steering angle is zero and the second clutch c24 is disengaged, changing the degree of engagement of the first clutch c23 makes it possible to change the power distribution ratio between the front wheels 2 and the rear wheels 3 in a range of about 100:0 to 50:50.

Figure 3B:
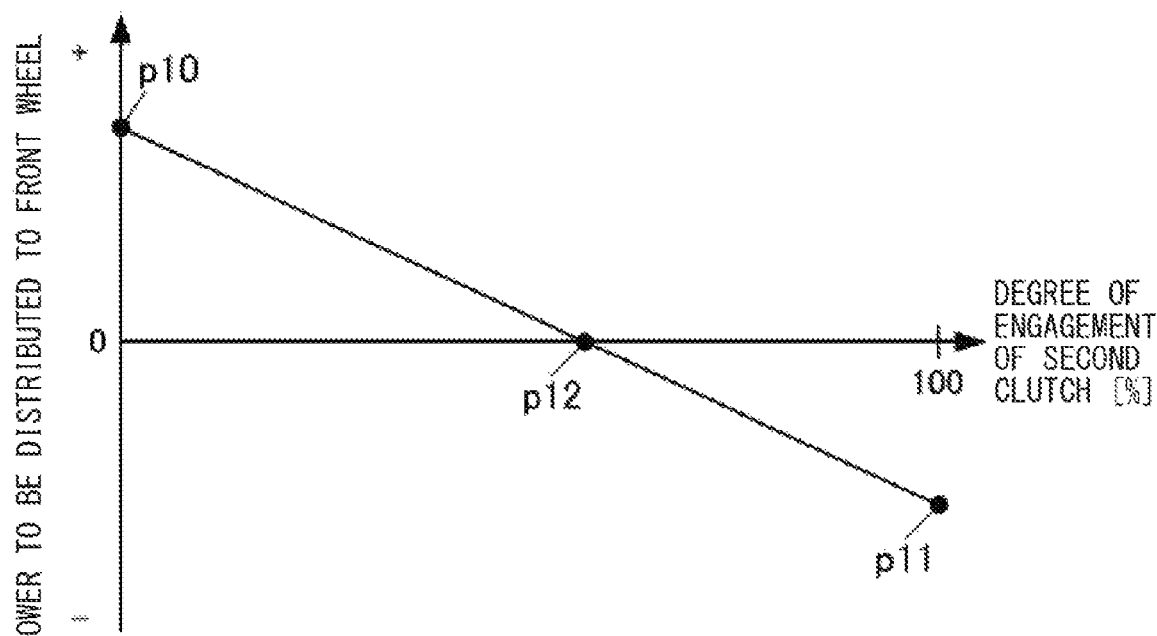
FIG. 3B is a graph that illustrates relation between a degree of engagement of a second clutch and the power to be distributed to the front wheels.

FIG. 3B is a graph illustrating relation between the degree of engagement of the second clutch c24 and power to be distributed to the front wheels 2. The graph illustrates the relation as mentioned above, in a case where the steering angle of the vehicle 1 is zero, i.e., the vehicle 1 is on the straight travel, the first clutch c23 is disengaged, and constant power is being outputted from the power source 11.

In a state in which both the first clutch c23 and the second clutch c24 are disengaged, power of the front wheel transmission shaft 142 is not distributed to the rear wheel transmission shaft 171. Accordingly, the power to be outputted to the front wheels 2 becomes greater. This corresponds to a state at a point p10 of the graph in FIG. 3B.

In a state in which both the front wheels 2 and the rear wheels 3 are traveling on the grip, by setting the gear ratios frontward and rearward of the second clutch c24 mentioned above, the rotation speed of the input shaft i24 of the second clutch c24 becomes slightly higher than the rotation speed of the output shaft o24. Accordingly, in a case where the first clutch c23 is disengaged and the second clutch c24 is brought to the half-engaged state close to the engagement, power is transmitted from the input shaft i24 of the second clutch c24 to the output shaft o24. In other words, power is transmitted from the front wheel transmission shaft 142 to the rear wheel transmission shaft 171 through the second clutch c24. Thus, traction in a driving direction is applied to the rear wheels 3. Furthermore, internal circulation torque is generated between the front wheels 2 and the rear wheels 3, causing traction in a braking direction to be applied to the front wheels 2. Accordingly, the power to be outputted to the front wheels 2 becomes a total value of the power to be transmitted from the power source 11 and a braking force by the internal circulation torque. This corresponds to a state at a point p11 of the graph in FIG. 3B.

Furthermore, in a state in which the degree of engagement of the second clutch c24 changes from 0% to nearly 100% while the first clutch c23 is disengaged, as illustrated in FIG. 3B, the power to be outputted to the front wheels 2 decreases from a value at the point p10 to a value at the point p11. At the degree of engagement in the middle, the power to be outputted to the front wheels 2 becomes substantially zero. This corresponds to a state at the point p12 of the graph in FIG. 3B.

To the rear wheels 3, power to be obtained by subtracting the power to be distributed to the front wheels 2 and the loss from the output of the power source 11 is outputted. Accordingly, in a case where the steering angle is zero, changing the degree of engagement of the second clutch c24 from 0% at the point p10 to the degree of engagement at the point p12 causes the power distribution ratio to change in a range of front: rear=100:0 to 0:100. However, in a case where the degree of engagement of the second clutch c24 becomes higher, the internal circulation torque becomes greater, causing an increase in the loss. Accordingly, with the output of the power source 11 being constant, power to be outputted to the front wheels 2 and the rear wheels 3 is reduced.

Characteristics of the transfer 20 illustrated in FIGS. 3A and 3B are those in the case where the steering angle of the vehicle 1 is zero, i.e., the vehicle 1 is on the straight travel. When the vehicle 1 corners, a change occurs in the internal circulation torque to be generated between the front wheels 2 and the rear wheels 3, in accordance with a radius of bend. This is because a difference occurs between a length of a locus of the front wheel 2 and a length of a locus of the rear wheel 3. Thus, when cornering, even in a case where the degrees of engagement of the first clutch c23 and the second clutch c24 are fixed, a change occurs in the power distribution ratio between the front wheels 2 and the rear wheels 3 in accordance with the radius of bend.

<Composite Workings of First Distribution Mechanism 201 and Second Distribution Mechanism 202>

In a case where both the first clutch c23 and the second clutch c24 are engaged, the first driven gear g21 and the second driven gear g22 do not move.

In a case where the first clutch c23, the second clutch c24, or both are in the half-engaged state, composite power of the power described with reference to FIG. 3A and the power described with reference to FIG. 3B is outputted to the front wheels 2 and the rear wheels 3. This composition of the power of the power source 11 and the power by the internal circulation torque makes it possible to control the power distribution ratio between the front wheels 2 and rear wheels 3 in a wide range from front: rear≈100:0 to front: rear≈0:100. This is because the power by the internal circulation torque acts negatively.

Furthermore, when the vehicle 1 corners, whatever radius of bend is, the internal circulation torque occurring between the front wheels 2 and the rear wheels 3 does not become zero in the first distribution mechanism 201, the second distribution mechanism 202, or both. Alternatively, even in a case where the internal circulation torque becomes too large in one of the first transfer mechanism 201 or the second transfer mechanism 202, the internal circulation torque in the other of the first transfer mechanism 201 or the second transfer mechanism 202 may be suppressed to moderate magnitude. Accordingly, when cornering, whatever the radius of bend is, the composition of the power to be distributed by the first distribution mechanism 201 and the power to be distributed by the second distribution mechanism 202 makes it possible to allow the power to include negative power by the internal circulation torque of the moderate magnitude. Hence, it is possible to control the power distribution ratio between the front wheels 2 and the rear wheels 3 in the wide range from, for example, front: rear≈100:0 to front: rear≈0:100.

The internal circulation torque described above is torque to be transmitted from the front wheel 2 to the rear wheel 3 or vice versa on the power transmission path between the front wheel 2 and the rear wheel 3. The internal circulation torque means torque to be absorbed by, for example, sliding of the first clutch c23 or the second clutch c24 and torsion of each mechanism on the power transmission path.

It is to be noted that, as for the power distribution ratio controllable by the transfer 20, the power to be distributed to the front wheels 2 does not have to become zero. For example, the power distribution ratio may range from front: rear=100:0 to 30:70, or alternatively, the power distribution ratio may range from front: rear=100:0 to 20:80.

<Control Example of Transfer 20>

Figure 4:
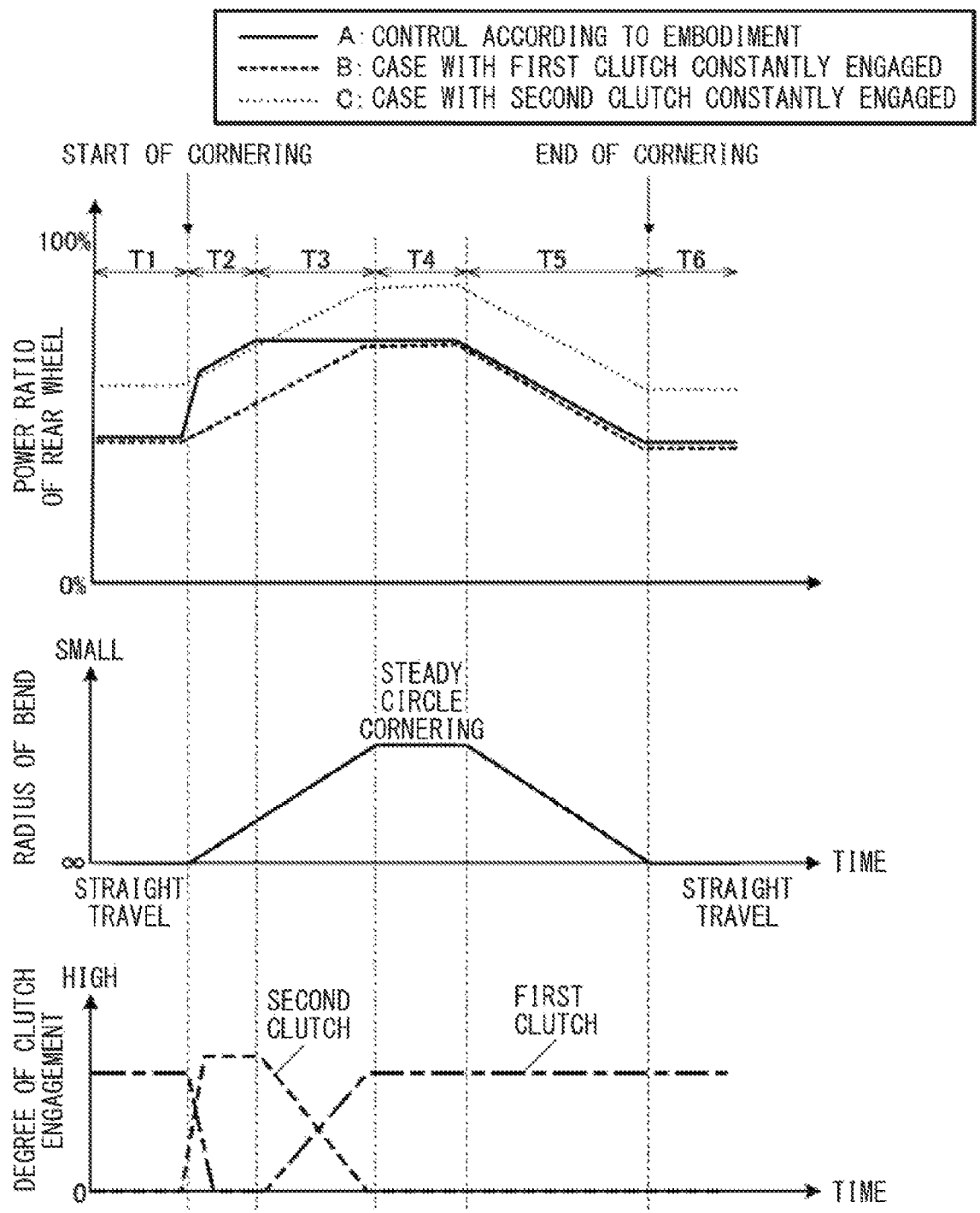
FIG. 4 is a time chart that illustrates a control example of the transfer according to the first embodiment.
Figure 5A:
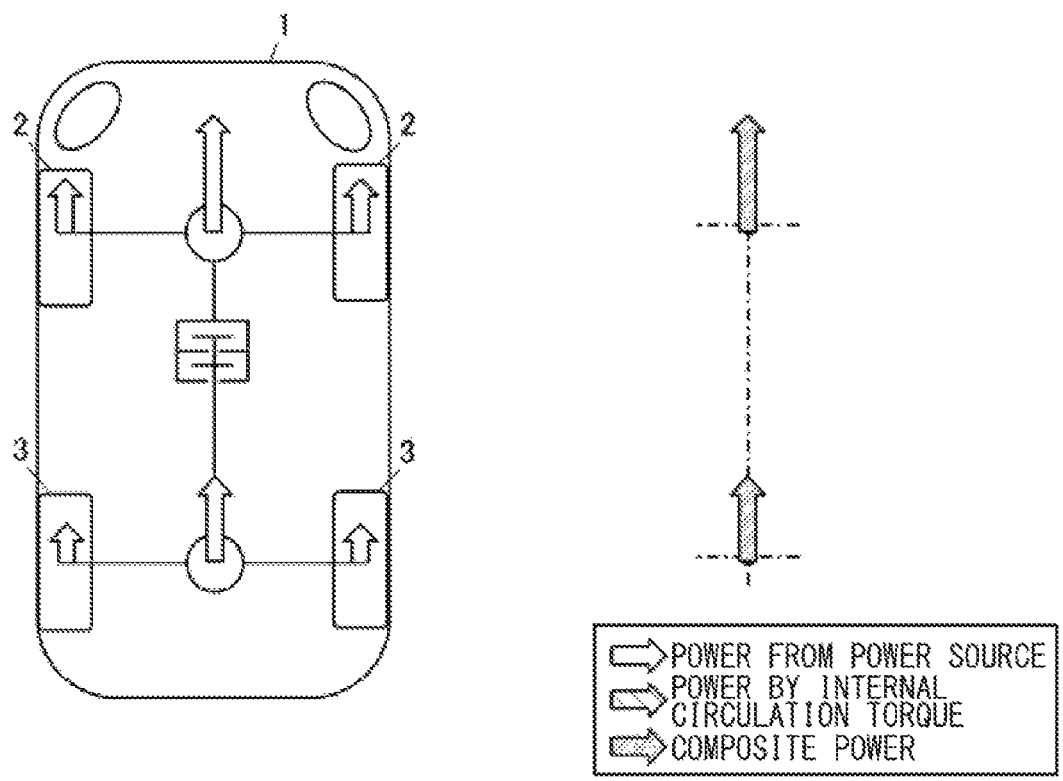
FIG. 5A illustrates a power distribution example in a period of straight travel in FIG. 4.
Figure 5B:
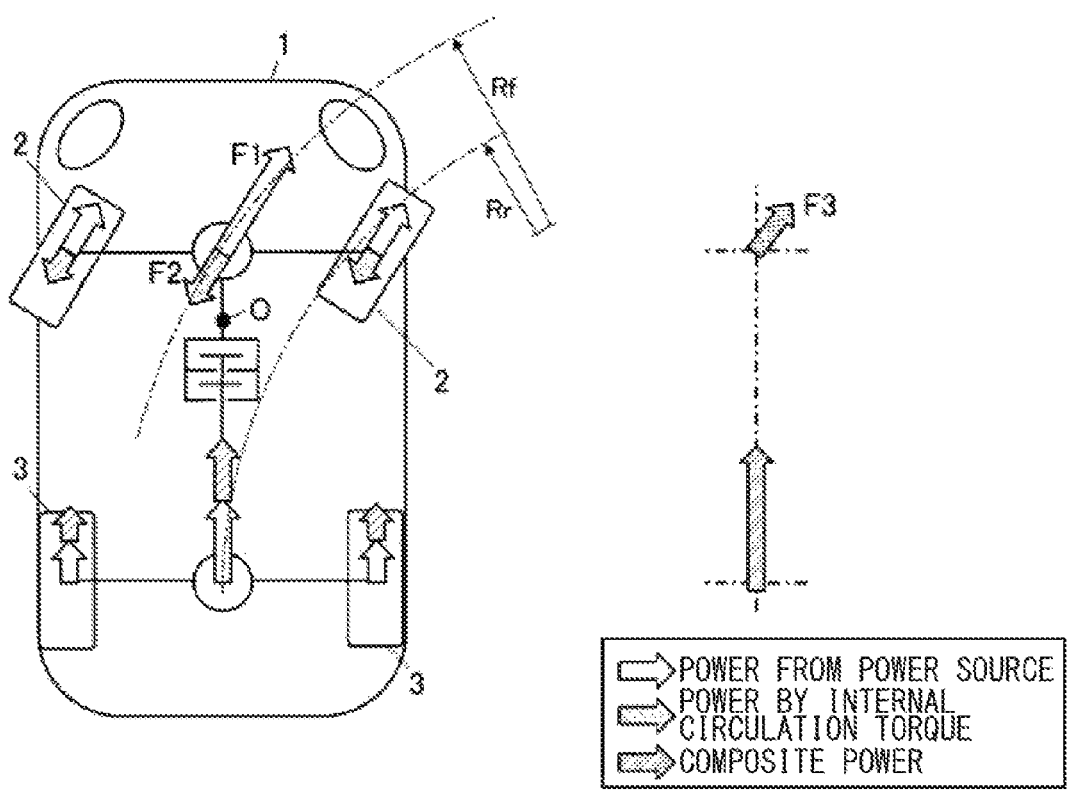
FIG. 5B illustrates a power distribution example in a period of a start of cornering in FIG. 4.

FIG. 4 is a time chart illustrating a control example of the transfer according to the first embodiment. FIG. 5A illustrates a power distribution example in a period T1 of the straight travel in FIG. 4. FIG. 5B illustrates a power distribution example in a period T2 of a start of cornering in FIG. 4. In FIGS. 5A and 5B, the composite power is illustrated beside the vehicle 1.

FIG. 4 illustrates a travel example in which the vehicle 1 makes sequential transitions from the straight travel to the cornering, and from the cornering to the straight travel. A line A in FIG. 4 represents the power distribution ratio to the rear wheels 3 in a case where the control according to the embodiment is made. A line B in FIG. 4 represents the power distribution ratio to the rear wheels 3 in a case where the first clutch c23 is engaged. A line C in FIG. 4 represents the power distribution ratio to the rear wheels 3 in a case where the second clutch c24 is engaged.

As denoted by the lines B and C, in a case where the relation of the gear ratios between the front wheels 2 and the rear wheels 3 is fixed, the power distribution ratio to the rear wheels 3 becomes higher when cornering than on the straight travel. Furthermore, when cornering, the smaller the radius of bend, the higher the power distribution ratio to the rear wheels 3. This is because the smaller the radius of bend, the longer the locus of the front wheel 2 than the locus of the rear wheel 3.

In the period T1 of the straight travel, the processor 35 may disengage the second clutch c24 and control the first clutch c23 in the engagement or the half-engaged state. By this control, as denoted by the line A, the power distribution ratio ranges from front: rear=50:50 to 70:30. This leads to stability on the straight travel. That is, even in a case where a yaw moment is applied to the vehicle 1 due to a disturbance, an anti-yaw moment acts to restore the straight travel. FIG. 5A illustrates a state in which the second clutch c24 is disengaged, the first clutch c23 is in an 80% engaged state, and the power distribution ratio is front: rear=60:40.

In the period T2 of the start of the cornering, the processor 35 may disengage the first clutch c23 and raise the degree of engagement of the second clutch c24. By this control, as denoted by the line A, the power distribution ratio to the rear wheels 3 becomes higher. Furthermore, at this occasion, as illustrated in FIG. 5B, the internal circulation torque occurs between the front wheels 2 and the rear wheels 3. This causes a braking force F2 due to the internal circulation torque to be applied to the power F1 to be transmitted from the power source 11 to the front wheel 2. Thus, the composite power F3 to be distributed to the front wheels 2 is reduced. The reduction in the composite power F3 to be distributed to the front wheels 2 causes reduction in a ratio of a grip force to be used in a direction of propulsion among grip forces on the front wheels 2, while causing an increase in a ratio of a grip force to be used in a lateral direction. That is, a lateral force limit of the front wheel 2 becomes large. The lateral force limit is a limit lateral force that suppresses a side-slip. This leads to enhanced cornering performance of the vehicle 1. Furthermore, even in a case where the composite power F3 on the front wheel 2 becomes smaller, the high power distribution ratio to the rear wheels 3 makes it possible to obtain a propulsive force of the vehicle 1 from the rear wheels 3. With such workings, the vehicle 1 makes the stable transition to the cornering as intended by the driver.

In a period T3 of a middle stage of the cornering, the processor 35 may bring the first clutch c23 to the half-engaged state, and bring the second clutch c24 to the half-engaged state. Furthermore, as the radius of bend becomes smaller, the processor 35 may gradually change the first clutch c23 from the disengagement to the engagement, and gradually change the second clutch c24 from the engagement to the disengagement. By this control, as denoted by the line A, the radius of bend becomes smaller. This suppresses the power distribution ratio between the front wheels 2 and the rear wheels 3 from changing greatly, and maintains the power distribution ratio between the front wheels 2 and the rear wheels 3 at an appropriate value. Accordingly, as illustrated in FIG. 5B, it is possible to maintain the cornering of the vehicle 1 in a state in which the composite power F3 on the front wheels 2 is appropriately small, and the lateral force limit of the front wheels 2 is large. Moreover, the high power distribution ratio to the rear wheels 3 inhibits reduction in the propulsive force of the vehicle 1. This makes it possible to realize the stable cornering of the vehicle 1 as intended by the driver.

Afterwards, in a period T4 of steady circle cornering, a period T5 of a final stage of the cornering, and a period T6 of the straight travel after the end of the cornering, the processor 35 may maintain the first clutch c23 at a high degree of engagement, and disengage the second clutch c24. By this control and the change in the radius of bend, the power distribution ratio between the front wheels 2 and the rear wheels 3 is gradually restored to the ratio for the straight travel, toward the end of the cornering. Thus, the restoration of the distribution ratio to the ratio for the straight travel causes a gradual decrease in the yaw moment applied to the vehicle 1 when cornering. In the period T6 of the straight travel, stable straight travel is restored.

For example, in the period T3 of the middle stage of the cornering, both the first clutch c23 and the second clutch c24 are controlled to the half-engaged state. On this occasion, the internal circulation torque is generated between the first clutch c23 and the second clutch c24, separately from the internal circulation torque between the front wheels 2 and the rear wheels 3. Thus, a loss because of clutch sliding occurs. The processor 35 may calculate loss energy caused by the internal circulation torque described above, on the basis of the rotation speeds of the front wheels 2 and the rear wheels 3, and the degrees of engagement of the first clutch c23 and the second clutch c24. The processor 35 may output the instruction to increase the torque to the travel control processor 33. To the instruction to increase the torque, data indicating an amount of increase in the torque based on the calculated loss energy described above may be added.

Upon receiving the instruction to increase the torque, the travel control processor 33 may add the torque for the loss as mentioned above to the target torque corresponding to the driving operation, to update the target torque. The update of the target torque causes an increase in output torque of the power source 11. Such a control provides compensation of the loss of the torque caused by bringing both the first clutch c23 and the second clutch c24 to the half-engaged state. This suppresses an actual propulsive force of the vehicle 1 from deviating greatly from a propulsive force corresponding to the driving operation by the driver. The internal circulation torque to be generated between the first clutch c23 and the second clutch c24 described above is torque to be transmitted between the first clutch c23 and the second clutch c24. The internal circulation torque to be generated between the first clutch c23 and the second clutch c24 means torque to be absorbed by, for example, the sliding of the first clutch c23 or the second clutch c24, and the torsion of the mechanisms between the first clutch c23 and the second clutch c24.

It is to be noted that, in the period T2 of the start of the cornering, in a case where a side-slip of a tire may possibly occur, the processor 35 may estimate slip rates of the front wheels 2 and the rear wheels 3 on the basis of the outputs of the vehicle speed sensor 34a and the yaw rate sensor 34b. The processor 35 may calculate the power distribution ratio between the front wheels 2 and the rear wheels 3 in accordance with the radius of bend, the vehicle speed, and the estimated slip rates. The processor 35 may calculate the degree of engagement of the first clutch c23 and the degree of engagement of the second clutch c24, to provide the distribution ratio in accordance with the radius of bend. In this case, typically, as for both the degree of engagement of the first clutch c23 and the degree of engagement of the second clutch c24, the degrees of engagement in the half-engaged state are obtained as a calculation result. The processor 35 may adjust the degrees of engagement of the first clutch c23 and the second clutch c24 to the respective values of the degrees of engagement obtained by the calculation, and thereby make the power distribution between the front wheels 2 and the rear wheels 3 corresponding to the situation described above. With such a control, it is possible to allow the vehicle 1 to corner as intended by the driver.

Furthermore, when traveling on a slippery low μ road, the processor 35 may make a feed-forward control of a rotation speed ratio between the front wheels 2 and the rear wheels 3 by changing the power distribution ratio between the front wheels 2 and the rear wheels 3 on the basis of a time change of the steering angle appearing in an operation signal of the steering part 32c. In addition, the processor 35 may make a feedback control of the power distribution to the front wheels 2 and the rear wheels 3 on the basis of on the rotation speed ratio between the front wheels 2 and the rear wheels 3 detected by the vehicle speed sensor 34a. In the feedback feed-forward control described above on the low μ road, it is desirable to smoothly change the power distribution ratio between the front wheels 2 and the rear wheels 3 in a situation where the steering angle varies variously. This is because an abrupt change in the power distribution ratio on the low μ road hinders stable travel. The processor 35 is configured to control the degree of engagement of the first clutch c23 and the degree of engagement of the second clutch c24, and thereby change smoothly the power distribution ratio between the front wheels 2 and the rear wheels 3 even in the situation where the steering angle varies variously. This leads to the stable travel of the vehicle 1 on the low μ road.

Moreover, on the low μ road, sliding of the front wheels 2 and the rear wheels 3 may sometimes cause difficulty in controlling behavior of the vehicle 1. In such a case, in a configuration including either the first clutch c23 or the second clutch c24, it is difficult to control the power distribution ratio between the front wheels 2 and the rear wheels 3 to a desired value depending on the steering angle and the slip rates of the front wheels 2 and the rear wheels 3. This results in a compulsive stand-by without making any control until the sliding of the front wheels 2 and the rear wheels 3 is eliminated by, for example, resistance of a road surface. In contrast, in this embodiment, the processor 35 is configured to control the first clutch c23 and the second clutch c24, and thereby control the power distribution ratio between the front wheels 2 and the rear wheels 3 to a desired value in many situations in which the steering angle and the slip rates of the front wheels 2 and the rear wheels 3 differ variously. Hence, it is possible to reduce possible uncontrollability of the behavior of the vehicle 1.

<Control Processing by Processor 35>

Figure 6:
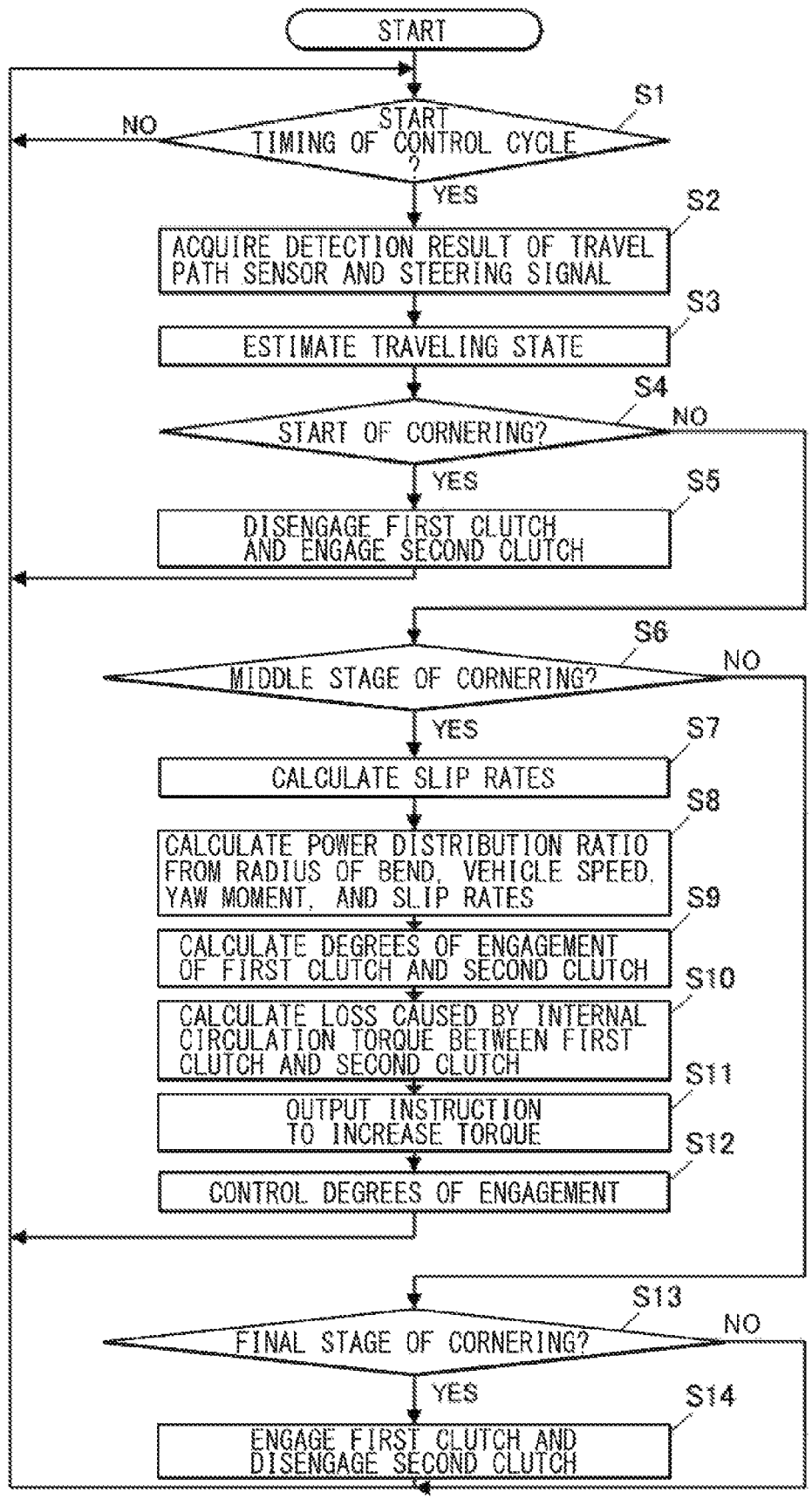
FIG. 6 is a flowchart of an example of control processing to be carried out by a processor.

FIG. 6 is a flowchart illustrating control processing to be carried out by the processor 35. The control processing in FIG. 6 may be carried out by the processor 35 while the vehicle 1 is traveling.

At a start of the control processing, the processor 35 may determine whether or not it is start timing of a predetermined control cycle (step S1). In a case where it is the start timing, the processor 35 may start the processing. The control cycle is set to a short period of time.

As the processing progresses, the processor 35 may acquire the detection result of the traveling path sensor 34c and the signal of the steering part 32c (step S2), and estimate the traveling state of the vehicle 1 (step S3).

Thereafter, the processor 35 may determine whether or not the traveling state is at the start of the cornering (step S4). In negation, the processor 35 may determine whether or not the traveling state is at the middle stage of the cornering (step S6). In negation, the processor 35 may determine whether or not the traveling state is at the final stage of the cornering (step S13). In negation in steps S4, S6 and S13, the processor 35 may cause the flow to return to step S1, and wait for the start of the next control cycle. The cornering to be determined in steps S4, S6, and S13 may be limited to cornering of a predetermined size, e.g., cornering in which a centrifugal force of predetermined magnitude acts on the vehicle 1. Small cornering may be excluded from the cornering to be determined in steps S4, S6, and S13.

In step S4, in a case with a determination that the traveling state is at the start of the cornering, the processor 35 may control the first clutch c23 to the disengagement and control the second clutch c24 to the engagement (step S5). Thereafter, the processor 35 may cause the flow to return to step S1.

In step S6, in a case with a determination that the traveling state is at the middle stage of the cornering, the processor 35 may, first, calculate the slip rates of the left front wheel 2, the right front wheel 2, the left rear wheel 3, and the right rear wheel 3 on the basis of the outputs of the sensors 34 (step S7). Thereafter, the processor 35 may calculate the power distribution ratio between the front wheels 2 and the rear wheels 3 suitable for the traveling state, on the basis of the radius of bend, the vehicle speed, the yaw moment, and the slip rates (step S8). The processor 35 may calculate the degrees of engagement of the first clutch c23 and the second clutch c24 to provide the distribution ratio in step S8 (step S9). Furthermore, the processor 35 may calculate the loss caused by the internal circulation torque to be generated between the first clutch c23 and the second clutch c24 at the degrees of engagement (step S10). The processor 35 may output the instruction to increase the torque to compensate the loss, to the travel control unit 33 (step S11). The processor 35 may control the first clutch c23 and the second clutch c24 to provide the degrees of engagement calculated in step S9 (step S12). Thereafter, the processor 35 may cause the flow to return to step S1.

In a storage of the processor 35, map data may be held in advance. The map data represents relation between arguments and results in the calculation of respective steps S8, S9, and S10. The processor 35 may carry out the calculation of respective steps S8, S9, and S10 with the use of the map data. The map data may be created by running simulation or running tests of the vehicle 1.

In a case where steps S4, S6, and S13 result in a determination that the traveling state is at the final stage of the cornering, the processor 35 may control the first clutch c23 to the engagement and control the second clutch c24 to the disengagement (step S14). Thereafter, the processor 35 may cause the flow to return to step S1.

By the control processing described above, states of the engagement of the first clutch c23 and the second clutch c24 of the transfer 20 are switched, to make the power distribution to the front wheels 2 and the rear wheels 3 in accordance with the traveling state of the vehicle 1.

In the control processing described above, an example is given in which the processor 35 carries out the control of steps S7 to S12 at the middle stage of the cornering. In one alternative, the processor 35 may carry out the control of steps S7 to S12 in various traveling situations.

The program of the control processing described above may be held in a non-transitory computer readable medium such as a ROM (Read Only Memory) in the processor 35. The processor 35 may be configured to read the program held in a portable non-transitory computer readable medium and execute the program. The portable non-transitory computer readable medium as mentioned above may hold the program of the control processing described above.

<Second Embodiment>

Figure 7:
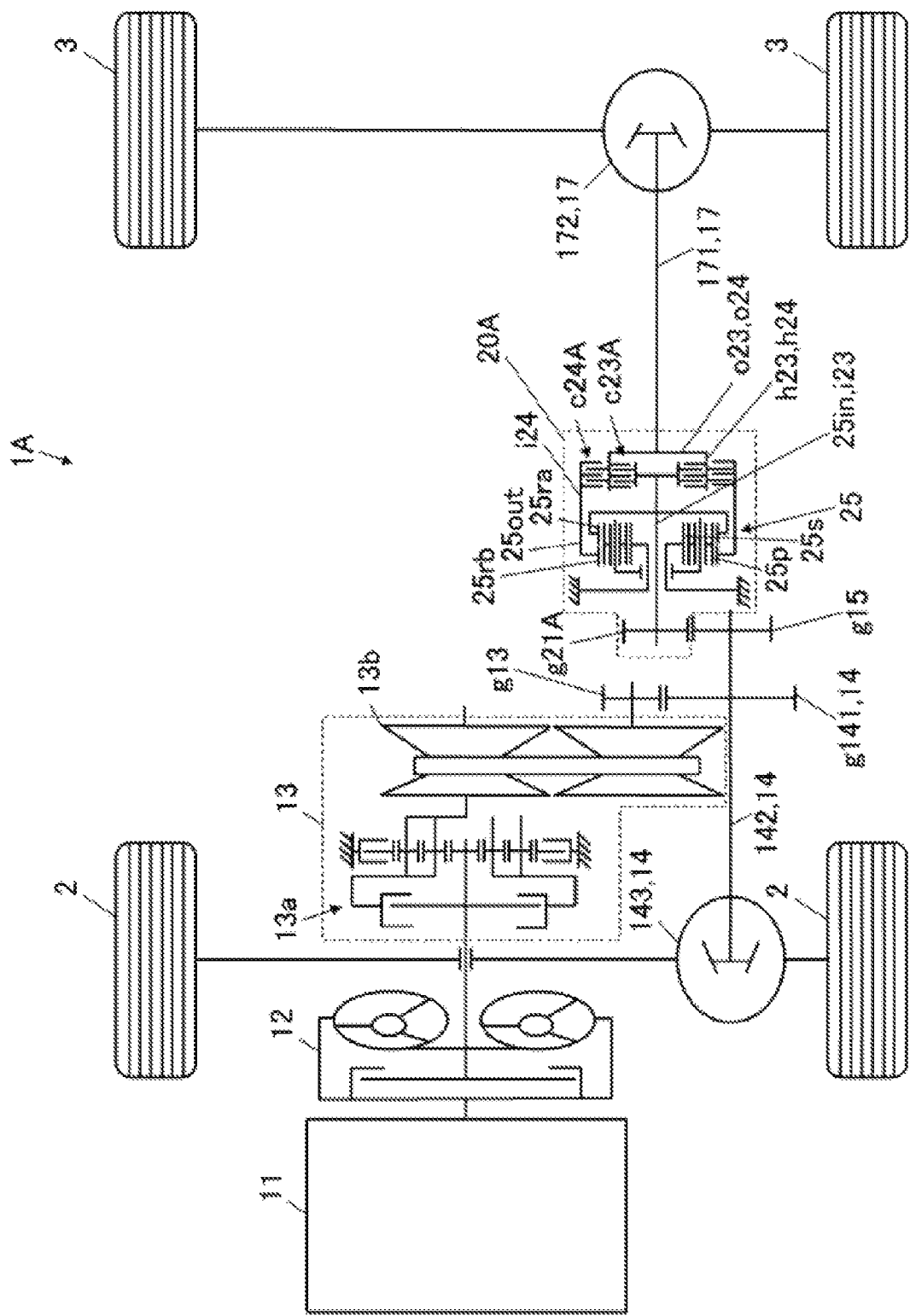
FIG. 7 is a schematic diagram of a configuration of a drive system of a vehicle including a transfer according to a second embodiment of the technology.

FIG. 7 illustrates a configuration of a drive system of a vehicle including a transfer according to a second embodiment of the technology. A transfer 20A according to the second embodiment differs from the first embodiment in a gear structure and a clutch structure. Similar configurations to those of the first embodiment are denoted by the same reference characters, and detailed description thereof is omitted.

The transfer 20A may include, without limitation, a planetary gear set 25 and a driven gear g21A. The planetary gear set 25 may include an input shaft 25in and an output shaft 25out. The driven gear g21A may be fitted to the input shaft 25in. Furthermore, the transfer 20A may include a first clutch c23A and a second clutch c24A. The first clutch c23A may be interposed between the input shaft 25in and the rear wheel transmission shaft 171. The second clutch c24A may be interposed between the output shaft 25out of the planetary gear set 25 and the rear wheel transmission shaft 171. The first clutch c23A may include, without limitation, the input shaft i23 and the output shaft o23. The second clutch c24A may include, without limitation, the input shaft i24 and the output shaft o24. To the front wheel transmission shaft 142, the driving gear g15 may be fitted. The driving gear g15 may be engaged with the driven gear g21A. The transfer 20A may introduce power from the front wheel transmission shaft 142 through the driving gear g15.

In one embodiment of the technology, out of the constituent elements mentioned above, a configuration of a combination of the driven gear g21A and the first clutch c23A may serve as the "first distribution mechanism". In one embodiment of the technology, a configuration of a combination of the driven gear g21A, the planetary gear set 25, and the second clutch c24A may serve as the "second distribution mechanism".

The planetary gear set 25 may include, without limitation, a sun gear 25s, a pinion gear 25p, two ring gears 25ra and 25rb, an input shaft 25in, and an output shaft 25out. The sun gear 25s is fixed. The pinion gear 25p is engaged with the sun gear 25s. The two ring gears 25ra and 25rb are engaged with the pinion gear 25p. The input shaft 25in is coupled to the ring gear 25*ra* and rotates unitarily with the ring gear 25*ra*. The output shaft 25*out* is coupled to the ring gear 25*rb* and rotates unitarily with the ring gear 25*rb*. The two ring gears 25*ra* and 25*b* differ in the number of teeth, causing the rotary motion inputted to the planetary gear set 25 through the input shaft 25*in* to be shifted and outputted to the output shaft 25*out*.

In the planetary gear set 25, the input shaft 25*in* and the output shaft 25*out* may be disposed coaxially. Moreover, the driven gear g21A, the first clutch c23A, and the second clutch c24A may be disposed coaxially with the input shaft 25*in* and the output shaft 25*out* of the planetary gear set 25. A clutch plate of the first clutch c23A and a clutch plate of the second clutch c24A may be disposed at the same position in a direction of a rotation axis, and disposed respectively inwardly and outwardly in a radial direction. The direction of the rotation axis is a direction along the rotation axis. The radial direction is a direction perpendicular to the rotation axis. Out of the first clutch c23A and the second clutch c24A, a member h23 of the first clutch c23A, e.g., a housing, and a member h24 of the second clutch c24A, e.g., a clutch hub, may be unitized. The member h23 may be fitted to a driven clutch plate of the first clutch c23A and rotate unitarily therewith. The member h24 may be fitted to a driven clutch plate of the second clutch c24A and rotate unitarily therewith.

The gear ratios between the planetary gear set 25, the gear mechanism, i.e., the driving gear g15 and the driven gear g21A, and the differential gears 143 and 172 may be set to satisfy the following conditions 1 and 2.

The condition 1: the gear ratio from the input shaft i24 of the second clutch c24A to the front wheel 2 is greater than the gear ratio from the output shaft o24 of the second clutch c24A to the rear wheel 3. As for the difference between the gear ratios, the latter gear ratio may be greater than the former gear ratio by about 0.5% to 3%.

The condition 2: the gear ratio from the input shaft i23 of the first clutch c23A to the front wheel 2 is equal to the gear ratio from the output shaft o23 of the first clutch c23A to the rear wheel 3. Here, the term "equal" is not limited to exact coincidence, but includes coincidence including a negligible error compared with the difference between the gear ratios on the condition 1, e.g., 0.5% to 3%.

As with the first embodiment, the processor 35 is configured to control both the first clutch c23A and the second clutch c24A to the half-engaged state. Furthermore, the processor 35 is configured to independently control the degree of engagement in the half-engaged state of the first clutch c23A and the degree of engagement in the half-engaged state of the second clutch c24A. As with the first embodiment, the processor 35 may control the transfer 20A in accordance with the traveling state.

According to the transfer 20A of the second embodiment, a configuration that introduces power is unified in the single driven gear g21A. Accordingly, the transfer 20A of the second embodiment is easily applicable to a vehicle 1B including the transverse power source 11. The term "transverse" means an arrangement in which an axial direction of an output shaft from which power is outputted is substantially perpendicular to a longitudinal direction of the vehicle 1.

Figure 8:
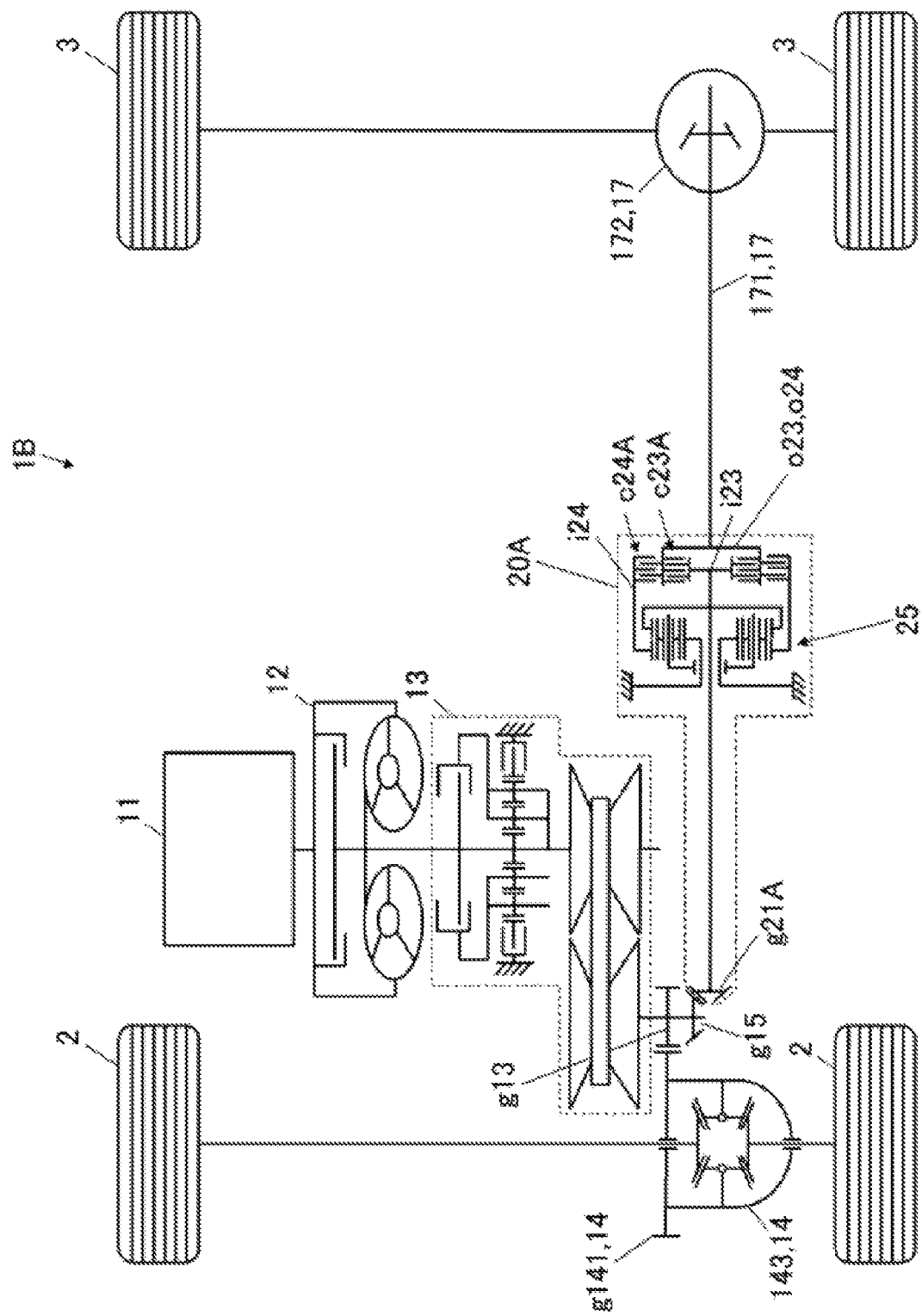
FIG. 8 is a schematic diagram of an example where the transfer according to the second embodiment is mounted on a vehicle including a transverse power source.

FIG. 8 is a schematic diagram of an example where the transfer according to the second embodiment is mounted on a vehicle including a transverse power source. As illustrated in FIG. 8, in a case of application to the transverse power source 11, the driven gear g21A configured to introduce power to the transfer 20A is changed from a gear configured to transmit power between parallel shafts, e.g., a spur gear and a helical gear, to a gear configured to transmit power between intersecting shafts, e.g., a bevel gear. Similarly, the driving gear g15 configured to output power to the transfer 20A is changed from a gear configured to transmit power between parallel shafts to a gear configured to transmit power between intersecting shafts. In the case with the transverse power source 11, the front wheel transmission shaft 142 extending in the longitudinal direction of the vehicle 1 may be omitted, and the driving gear g15 may be fitted to an output shaft of the transmission 13. Furthermore, a gear mechanism configured to adjust a gear ratio may be interposed between the driving gear g15 and the transmission 13.

In the configuration in FIG. 8 as well, as for a plurality of gear configurations located on the power transmission path between the front wheels 2 and the rear wheels 3, the gear ratios may be set to satisfy the following conditions 1 and 2.

The condition 1: the gear ratio from the input shaft i24 of the second clutch c24A to the front wheel 2 is greater than the gear ratio from the output shaft o24 of the second clutch c24A to the rear wheel 3. As for the difference between the gear ratios, the latter gear ratio may be greater than the former gear ratio by about 0.5% to 3%.

The condition 2: the gear ratio from the input shaft i23 of the first clutch c23A to the front wheel 2 is equal to the gear ratio from the output shaft o23 of the first clutch c23A to the rear wheel 3. The term "equal" is not limited to exact coincidence, but includes coincidence including a negligible error compared with the difference between the gear ratios on the condition 1, e.g., 0.5% to 3%.

As described, the transfer 20 according to the first embodiment includes the first distribution mechanism 201. The first distribution mechanism 201 is configured to distribute a portion of power from the power source 11 to the rear wheel transmission shaft 171 through the first clutch c23. The first clutch c23 is configured to be controlled to the half-engaged state. Furthermore, the transfer 20 includes the second distribution mechanism 202. The second distribution mechanism 202 is configured to distribute a portion of power from the power source 11 to the rear wheel transmission shaft 171 though the second clutch c24. The second clutch c24 is configured to be controlled to the half-engaged state. Accordingly, it is possible to control both the first clutch c23 and the second clutch c24 to the half-engaged state. With this control, it is possible to compose the power to be distributed to the front wheels 2 and the rear wheels 3 by the first distribution mechanism 201 and the power to be distributed to the front wheels 2 and the rear wheels 3 by the second distribution mechanism 202. Furthermore, controlling the degrees of engagement of the first clutch c23 or c23A, and the degrees of engagement of the second clutch c24 or c24A makes it possible to continuously adjust the power distribution ratio through the first distribution mechanism 201 and the power distribution ratio through the second distribution mechanism 202.

In addition, according to the transfer 20 of the first embodiment, the first difference is different from the second difference. The first difference is the difference between the gear ratio frontward of the first clutch c23 and the gear ratio rearward of the first clutch c23. The second difference is the difference between the gear ratio frontward of the second clutch c24 and the gear ratio rearward of the second clutch c24. Such setting of the gear ratios makes it possible to generate the internal circulation torque between the front wheels 2 and the rear wheels 3 in the first distribution mechanism 201, the second distribution mechanism 202, or both. The internal circulation torque acts as negative power. Accordingly, with the internal circulation torque, it is possible to distribute power at the ratio in the wider range than 50:50 to 100:0. Meanwhile, when cornering, the difference occurs between the length of the locus of the front wheel 2 and the length of the locus of the rear wheel 3. Accordingly, the magnitude of the internal circulation torque as mentioned above changes in accordance with the radius of bend. However, the setting of the gear ratios as mentioned above keeps the internal circulation torque through the first distributing mechanism 201 and the internal circulation torque through the second distributing mechanism 202 from both becoming zero. Furthermore, even in the case where one of the internal circulation torque through the first distribution mechanism 201 or the internal circulation torque through the second distribution mechanism 202 becomes excessive, it is possible to suppress the other to moderate magnitude. Thus, composing the power to be distributed by the first distribution mechanism 201 and the power to be distributed by the second distribution mechanism 202 makes it possible to compose the power from the power source 11 and the power caused by the internal circulation torque of appropriate magnitude, regardless of the radius of bend when cornering. With the composition described above, it is possible to control the power distribution ratio in a wide range both on the straight travel and when cornering.

Furthermore, the transfer 20 according to the first embodiment may include the processor 35. The processor 35 is configured to control both the first clutch c23 and the second clutch c24 to the half-engaged state in accordance with the traveling state of the vehicle 1. Accordingly, with the control by the processor 35, it is possible to control the power distribution ratio in a wide range both on the straight travel and when cornering. It is possible to provide a four wheel drive control suitable for the traveling state.

Furthermore, according to the transfer 20 of the first embodiment, in controlling both the first clutch c23 and the second clutch c24 to the half-engaged state, the processor 35 may output the instruction to increase the torque, to the travel control processor 33. By the instruction to increase the torque, the loss caused by the internal circulation torque to be generated between the first clutch c23 and the second clutch c24 is compensated. This suppresses the actual propulsive force of the vehicle 1 from deviating greatly from the propulsive force corresponding to the driving operation by the driver.

Furthermore, according to the transfer 20 of the first embodiment, the gear ratio from the input shaft i23 of the first clutch c23 to the front wheel 2 may be equal to the gear ratio from the output shaft o23 of the first clutch c23 to the rear wheel 3. Meanwhile, the gear ratio from the input shaft i24 of the second clutch c24 to the front wheel 2 may be greater than the gear ratio from the output shaft o24 of the second clutch c24 to the rear wheel 3. With such setting, it is possible to easily make the power distribution to the front wheels 2 and the rear wheels 3 suitable for the straight travel and the cornering.

The workings and the effects to be obtained by the transfer 20 of the first embodiment described above may be similarly produced in the configurations illustrated in FIGS. 1B, 7, and 8.

In addition, according to the transfer 20 of the first embodiment, the first distribution mechanism 201 may include the gear set including the first driven gear g21. The second distribution mechanism 202 may include the gear set including the second driven gear g22. By the gear ratios of the two gear sets mentioned above, it is possible to provide the difference between the gear ratios described above. With such a configuration, even in a case where, for example, the gear ratios of the differential gears 143 and 172 are different, making the gear ratios of the gear sets correspond makes it possible to provide the difference between the gear ratios described above. Hence, it is possible to easily cope with modifications of the vehicle 1.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing embodiments, a configuration is described in which power from the power source is transmitted to the front wheels without passing through the transfer, and to the rear wheels through the transfer. In an alternative configuration, power from the power source may be transmitted to the rear wheels without passing through the transfer, and to the front wheels through the transfer.

Moreover, in the forgoing embodiments, a configuration is described in which the two distribution mechanisms of the transfer are disposed coaxially and unitized. However, the two distribution mechanisms may be provided separately.

In the first embodiment, the modification example, and the second embodiment, an example is given in which the first difference becomes substantially zero. The first difference is the difference between the "gear ratio from the input shaft i23 of the first clutch c23 or c23A to the front wheel 2" and the "gear ratio from the output shaft o23 of the first clutch c23 or c23A to the rear wheel 3". Moreover, an example is given in which the second difference takes a value greater than zero. The second difference is the difference between the "gear ratio from the input shaft i24 of the second clutch c24 or c24A to the front wheel 2" and the "gear ratio from the output shaft o24 of the second clutch c24 or c24A to the rear wheel 3". However, the setting of these gear ratios is merely an example. The gear ratios may be set to allow both the first difference and the second difference to become greater than zero. Alternatively, the gear ratios may be set to allow both the first difference and the second difference to become smaller than zero. In another alternative, the gear ratios may be set to allow the first difference to become smaller than zero, and to allow the second difference to become greater than zero. In a case with a difference between the first difference and the second difference described above, it is possible to avoid the situation that both the internal circulation torque through the first distribution mechanism 201, and the internal circulation torque through the second distribution mechanism 202 become zero, regardless of the radius of bend when cornering. Moreover, even in the case where one of the internal circulation torque through the first distribution mechanism 201 or the internal circulation torque through the second distribution mechanism 202 becomes excessive, it is possible to suppress the other to the moderate magnitude.

Other details described in the forgoing example embodiments may be changed as appropriate within the scope of the technology.

According to the aspects of the technology, controlling both a first clutch and a second clutch to a half-engaged state makes it possible to compose power to be distributed to a first driving wheel and a second driving wheel by a first distribution mechanism, and power to be distributed to the first driving wheel and the second driving wheel by a second distribution mechanism. Furthermore, controlling a degree of engagement of the first clutch and a degree of engagement of the second clutch makes it possible to adjust continuously a power distribution ratio through the first distribution mechanism and a power distribution ratio through the second distribution mechanism. In addition, setting of gear ratios makes it possible to generate internal circulation torque between the first driving wheel and the second driving wheel, in the first distribution mechanism, the second distribution mechanism, or both. The internal circulation torque acts as negative power. Accordingly, with the internal circulation torque, it is possible to provide the power distribution ratio in a wider range than 50:50 to 100:0. For example, it is possible to provide the power distribution ratio in a range of 0:100 to 100:0, or a range of 30:70 to 100:0. Meanwhile, when cornering, a difference occurs between a length of a locus of the first driving wheel and a length of a locus of the second driving wheel. This causes a change in the magnitude of the internal circulation torque as mentioned above in accordance with a radius of bend. However, the setting of the gear ratios keeps the internal circulation torque through the first distribution mechanism and the internal circulation torque through the second distribution mechanism from both becoming zero. Furthermore, in a case where one of the internal circulation torque through the first distribution mechanism or the internal circulation torque through the second distribution mechanism becomes excessive, it is possible to suppress the other to moderate magnitude. Thus, composing power to be distributed by the first distribution mechanism and power to be distributed by the second distribution mechanism makes it possible to compose power from a power source and power caused by the internal circulation torque of moderate magnitude, regardless of the radius of bend when cornering. Hence, with the composition described above, it is possible to control the power distribution ratio in a wide range both on straight travel and when cornering.

The processor 35 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 35 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 35 illustrated in FIG. 2.

The invention claimed is:

1. A transfer for a vehicle, the vehicle being a four wheel drive vehicle and including a first driving wheel, a second driving wheel, a power source, a first transmission mechanism, and a second transmission mechanism, the first driving wheel and the second driving wheel being arranged in longitudinally spaced relation, the first transmission mechanism being configured to transmit power to the first driving wheel, and the second transmission mechanism being configured to transmit power to the second driving wheel, the transfer comprising:
   a first distribution mechanism including a first clutch and configured to distribute a portion of power from the power source to the second transmission mechanism through the first clutch, the first clutch being configured to be controlled to a half-engaged state between engagement and disengagement; and
   a second distribution mechanism including a second clutch and configured to distribute a portion of power from the power source to the second transmission mechanism through the second clutch, the second clutch being configured to be controlled to the half-engaged state, wherein
   a first difference is different from a second difference, the first difference being a difference between a gear ratio from an input shaft of the first clutch to the first driving wheel and a gear ratio from an output shaft of the first clutch to the second driving wheel, and the second difference being a difference between a gear ratio from an input shaft of the second clutch to the first driving wheel and a gear ratio from an output shaft of the second clutch to the second driving wheel.

2. The transfer according to claim 1, further comprising a processor configured to control both the first clutch and the second clutch to the half-engaged state in accordance with a traveling state of the vehicle.

3. The transfer according to claim 2, wherein
   in controlling both the first clutch and the second clutch to the half-engaged state, the processor is configured to output an instruction to increase torque to be outputted from the power source to a greater value than torque corresponding to a driving operation to be performed by a driver who drives the vehicle.

4. The transfer according to claim 1, wherein
   the first driving wheel comprises a front wheel, and the second driving wheel comprises a rear wheel,
   the gear ratio from the input shaft of the first clutch to the first driving wheel is equal to the gear ratio from the output shaft of the first clutch to the second driving wheel, and
   the gear ratio from the input shaft of the second clutch to the first driving wheel is greater than the gear ratio from the output shaft of the second clutch to the second driving wheel.

5. The transfer according to claim 2, wherein
   the first driving wheel comprises a front wheel, and the second driving wheel comprises a rear wheel,
   the gear ratio from the input shaft of the first clutch to the first driving wheel is equal to the gear ratio from the output shaft of the first clutch to the second driving wheel, and
   the gear ratio from the input shaft of the second clutch to the first driving wheel is greater than the gear ratio from the output shaft of the second clutch to the second driving wheel.

6. The transfer according to claim 3, wherein
   the first driving wheel comprises a front wheel, and the second driving wheel comprises a rear wheel, the gear ratio from the input shaft of the first clutch to the first driving wheel is equal to the gear ratio from the output shaft of the first clutch to the second driving wheel, and the gear ratio from the input shaft of the second clutch to the first driving wheel is greater than the gear ratio from the output shaft of the second clutch to the second driving wheel.

7. The transfer according to claim 1, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

8. The transfer according to claim 2, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

9. The transfer according to claim 3, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

10. The transfer according to claim 4, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

11. The transfer according to claim 5, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

12. The transfer according to claim 6, wherein the first distribution mechanism includes a first gear set and is configured to distribute power through the first gear set and the first clutch, the second distribution mechanism includes a second gear set and is configured to distribute power through the second gear set and the second clutch, and a gear ratio of the first gear set and a gear ratio of the second gear set are different.

* * * * *